United States Patent
Plabst et al.

(10) Patent No.: US 12,280,677 B2
(45) Date of Patent: Apr. 22, 2025

(54) CURRENT COLLECTOR FOR A RAIL VEHICLE

(71) Applicant: Siemens Mobility GmbH, Munich (DE)

(72) Inventors: Roland Plabst, Alling (DE); Dieter Wendler, Aschaffenburg (DE)

(73) Assignee: Siemens Mobility GmbH, Munich (DE)

( * ) Notice: Subject to any disclaimer, the term of this patent is extended or adjusted under 35 U.S.C. 154(b) by 633 days.

(21) Appl. No.: 17/638,577

(22) PCT Filed: Jul. 10, 2020

(86) PCT No.: PCT/EP2020/069597
§ 371 (c)(1),
(2) Date: Feb. 25, 2022

(87) PCT Pub. No.: WO2021/037431
PCT Pub. Date: Mar. 4, 2021

(65) Prior Publication Data
US 2022/0297543 A1    Sep. 22, 2022

(30) Foreign Application Priority Data
Aug. 27, 2019   (DE) .................. 10 2019 212 826.2

(51) Int. Cl.
*B60L 5/19* (2006.01)
*B60L 5/08* (2006.01)
(Continued)

(52) U.S. Cl.
CPC .................. *B60L 5/19* (2013.01); *B60L 5/08* (2013.01); *B60L 5/085* (2013.01); *B60L 5/18* (2013.01);
(Continued)

(58) Field of Classification Search
CPC .... B60L 5/19; B60L 5/20; B60L 5/205; B60L 5/24; B60L 5/08; B60L 5/085; B60L 5/18; B60L 2200/26
(Continued)

(56) References Cited

U.S. PATENT DOCUMENTS

| 3,830,990 A * | 8/1974 | Gray ..................... B60L 5/22 191/55 |
| 2016/0180518 A1* | 6/2016 | Bahlmann ............. H04N 7/183 348/125 |
| 2020/0207211 A1* | 7/2020 | McMahan ............... B60L 5/39 |

FOREIGN PATENT DOCUMENTS

| CN | 102458902 A | 5/2012 |
| CN | 104385929 A | 3/2015 |

(Continued)

*Primary Examiner* — Zachary L Kuhfuss
*Assistant Examiner* — James William Jones
(74) *Attorney, Agent, or Firm* — Laurence A. Greenberg; Werner H. Stemer; Ralph E. Locher

(57) ABSTRACT

A current collector for a rail vehicle intended for international transport includes a support bringing two contact strips into electrically conductive contact with a contact wire on the roof of the rail vehicle. Each contact strip has a first length and a contact strip extension at each end. Each contact strip extension is rotatably mounted and connected to a respective end of the contact strip. In a first position the contact strip extensions are hinged inwards, such that a resulting total length of the contact strip with the associated contact strip extensions corresponds to the first length of the contact strip. In a second position, the contact strip extensions are hinged outwards, such that the resulting total length of the contact strip with the associated contact strip extensions corresponds to a second length of the contact strip which is greater than the first length.

9 Claims, 4 Drawing Sheets

(51) Int. Cl.
*B60L 5/18* (2006.01)
*B60L 5/20* (2006.01)
*B60L 5/24* (2006.01)

(52) U.S. Cl.
CPC ............... *B60L 5/20* (2013.01); *B60L 5/205* (2013.01); *B60L 5/24* (2013.01); *B60L 2200/26* (2013.01)

(58) Field of Classification Search
USPC ........................................ 191/57, 59.1, 72, 83
See application file for complete search history.

(56) References Cited

FOREIGN PATENT DOCUMENTS

| | | | | |
|---|---|---|---|---|
| CN | 106347134 A | 1/2017 | | |
| DE | 19601009 C1 * | 6/1997 | ............... | B60L 5/19 |
| DE | 102011013267 A1 | 9/2012 | | |
| DE | 102011050563 A1 * | 11/2012 | ............... | B60L 5/19 |
| DE | 102012108492 A * | 6/2014 | | |
| DE | 102012108492 A1 | 6/2014 | | |
| EP | 2455251 A2 * | 5/2012 | ............... | B60L 5/19 |
| EP | 2497674 A2 | 9/2012 | | |
| EP | 2607145 A1 * | 6/2013 | ............... | B60L 5/19 |
| EP | 2346710 B1 * | 8/2014 | ............... | B60L 5/19 |
| KR | 101758488 B1 * | 7/2017 | | |

* cited by examiner

CURRENT COLLECTOR FOR A RAIL VEHICLE

FIELD AND BACKGROUND OF THE INVENTION

The invention relates to a current collector for a rail vehicle which is preferably used for cross-border transport.

Various current collector rocker profiles, which are defined by standard EN 50367 for example, are used within the International Union of Railways ("Union internationale des Chemins de Fer, UIC"). At present, the following rocker widths are standardized or defined: 1450 mm, 1600 mm, 1800 mm, 1760 mm and 1950 mm.

In addition, various contact strips in respect of width and material are defined depending on current intensities used, for example:
- A contact strip containing carbon and having a width of from 35 mm to 42 mm is used in the case of AC operation with a current intensity of up to 600 A.
- A contact strip containing a metal-impregnated carbon and having a width of 42 mm to 60 mm is used in the case of DC operation with a current intensity of up to 4000 A.

As a result, a large number of different current collectors, which have to be taken into account for cross-border transport of a rail vehicle, exist in the International Union of Railways UIC.

For reasons of space, only a limited number of current collectors can be installed on the roof of a rail vehicle of this kind. A maximum of four installation spaces for current collectors are available on a customary rail vehicle, and therefore a number of countries to which a cross-border rail vehicle can travel is limited by the number of current collectors that can be fitted on the roof.

Looking at the situation outlined, a universal current collector which can be used in several power grids during cross-border transport would be desirable.

Documents EP 2 497 674 A2 and DE 10 2011 013 267 A1 both disclose a current collector of this kind. The current collector rocker of said current collector has divided contact strips and an integrated adjustment/locking mechanism. The contact strip ends and horns are displaced in the vehicle transverse direction. A first application of this solution is an AC current collector having a variable rocker width of between 1450 mm and 1950 mm. In this way, a current collector of this kind replaces two traditional current collectors which each have a fixed (rocker) width.

Document DE 10 2012 108 492 A1 discloses a current collector in which a current collector rocker has clips which can be displaced transversely with respect to the direction of travel. The clips are mounted on the current collector rocker by means of pivoting devices such that they can pivot in the vertical direction.

Document EP 2 455 251 A2 discloses a current collector rocker which has two parallel contact strips and two end horns. Horns which are fitted such that they can be shifted in relation to one another and parallel to the contact strips by means of an actuating device are arranged on the outer ends of the end horns. The end horns are fastened to the rocker in an articulated manner by means of levers.

SUMMARY OF THE INVENTION

The object of the present invention is to provide an improved current collector for a rail vehicle for cross-border transport, with which the abovementioned, country-specific limitations are overcome.

This object is achieved by the features of the independent claim 1. Advantageous developments are specified in the respective dependent claims.

The invention relates to a current collector for a rail vehicle which is intended for cross-border transport. The current collector has a support which is also referred to as a "current collector rocker".

Two contact strips, which both have a first length, are mounted on the support.

Here, the term "contact strip" is understood to mean an assembly which comprises a supporting profile or a supporting receiving apparatus and a conductive layer connected to it.

The conductive layer is preferably designed as a graphite layer. Electrical power is drawn from an overhead line or from a contact wire and supplied to the rail vehicle via the conductive layer or via the graphite layer.

The support is designed in such a way that, on the roof of the rail vehicle, it orients the two contact strips transversely with respect to the direction of travel of the rail vehicle and brings them into electrically conductive contact with the contact wire.

According to the invention, each contact strip has a respective contact strip extension at each end. The respective contact strip extension is connected to the respective end of the contact strip in a rotatably mounted manner. In a first position, the contact strip extensions are arranged with respect to the respective contact strip in such a way that a resulting total length of the contact strip with the associated contact strip extensions corresponds to the first length of the contact strip.

In other words, here, the contact strip extensions are folded closed by means of a rotational movement, so that, in the first position, they do not extend the associated contact strip.

In a second position, the contact strip extensions are arranged with respect to the respective contact strip in such a way that the resulting total length of the contact strip with the associated contact strip extensions corresponds to a second length, which is greater than the first length.

In other words, here, the contact strip extensions are folded open by means of a rotational movement, so that, in the second position, they extend the associated contact strip.

In one advantageous development, each contact strip extension has a horn or a correspondingly configured residual contour at one end, so that, in the second position of the contact strip extensions, the functionality of a horn is ensured for the extended contact strip.

In one advantageous development, the contact strip extensions are rotatable by means of hydraulic cylinders or by means of compressed-air cylinders, wherein each cylinder is connected to the support on a first side and to an associated contact strip extension on a second side.

In one advantageous development, the two contact strips are mounted on the support substantially parallel to one another at a predetermined distance.

In one advantageous development, the support is designed in such a way that, on the roof of the rail vehicle, it orients the two contact strips transversely with respect to the direction of travel of the rail vehicle and brings them into electrically conductive contact with the contact wire which is arranged along the direction of travel of the rail vehicle, in order to implement current draw from the contact wire to the contact strips.

In one advantageous development, the contact strips and the associated contact strip extensions are arranged in the first position and in the second position in such a way that the associated conductive layers or graphite layers are arranged in a common plane in order to ensure the power draw from the contact wire without problems.

In one advantageous development, the two contact strips of the first length are connected to one another at their respective ends, so that the functionality of a horn is implemented for the non-extended contact strips via the respective connection.

In the present invention, a current collector rocker or current collector having a width of 1450 mm is extended to 1950 mm by the rotatable contact strip extensions and therefore the resulting current collector is widened.

The contact strip extensions are arranged at the end of the two contact strips in each case and are rotated outward or folded outward by a rotary movement, so that an available contact strip useful length is increased.

In one advantageous development, the respective point of rotation, as the point of action for the cylinder, is situated in the central region of the contact strips and is furthermore selected such that, in the event of the rotational movement of the contact strip extensions, a continuous transition of the contact wire from the contact strips to the contact strip extensions is ensured.

In one advantageous development, a horn or a correspondingly configured residual contour is additionally fitted to each contact strip extension. These horns remain below the contour of the central region of the non-extended contact strips in the driven-in state of the extensions and have no way of making contact with the contact wire.

The horns of the contact strip extensions pivot outward together with said contact strip extensions and produce, for example in the rotated-out end state in the second position, the contour of the current collector having a width of 1950 mm in accordance with EN 50367.

In one advantageous development, the driving of the rotatable contact strip extensions is implemented with the aid of compressed-air cylinders which are supplied with compressed air by the rail vehicle through electrically non-conductive pipes.

Various embodiments are possible in respect of the cylinders: Each contact strip extension is driven directly by a dedicated compressed-air cylinder. The cylinders then form an oblique connection between the contact strip extensions and the support.

As an alternative to this, in each case two contact strip extensions situated on the same side are driven by just one compressed-air cylinder via coupling rods. This results in two cylinders which are arranged in the center of the support and parallel with respect to the contact strips.

The cylinders can be arranged one above the other or, if space permits, also next to one another and in a line.

The present invention achieves a universal current collector which can be used for cross-border transport in several power grids.

The present invention renders it possible to reduce the number of current collectors required to date on the roof of the rail vehicle.

The present invention expands the field of use given the same number of current collectors and achieves current collector redundancy in multi-system rail vehicles.

On the basis of the two prior art documents EP 2 497 674 A2 and DE 10 2011 013 267 A1 outlined in the introductory part, the number of compressed-air cylinders required can be reduced in the present invention: as described above, only two compressed-air cylinders, instead of the four compressed-air cylinders used in the prior art, are required in the most optimal case in the present invention.

This results both in a reduction in the weight of the current collector and an increase in the reliability of the entire technical construction.

The present invention will be explained in more detail below by way of example with reference to a drawing.

DETAILED DESCRIPTION OF THE INVENTION

Figure 1:
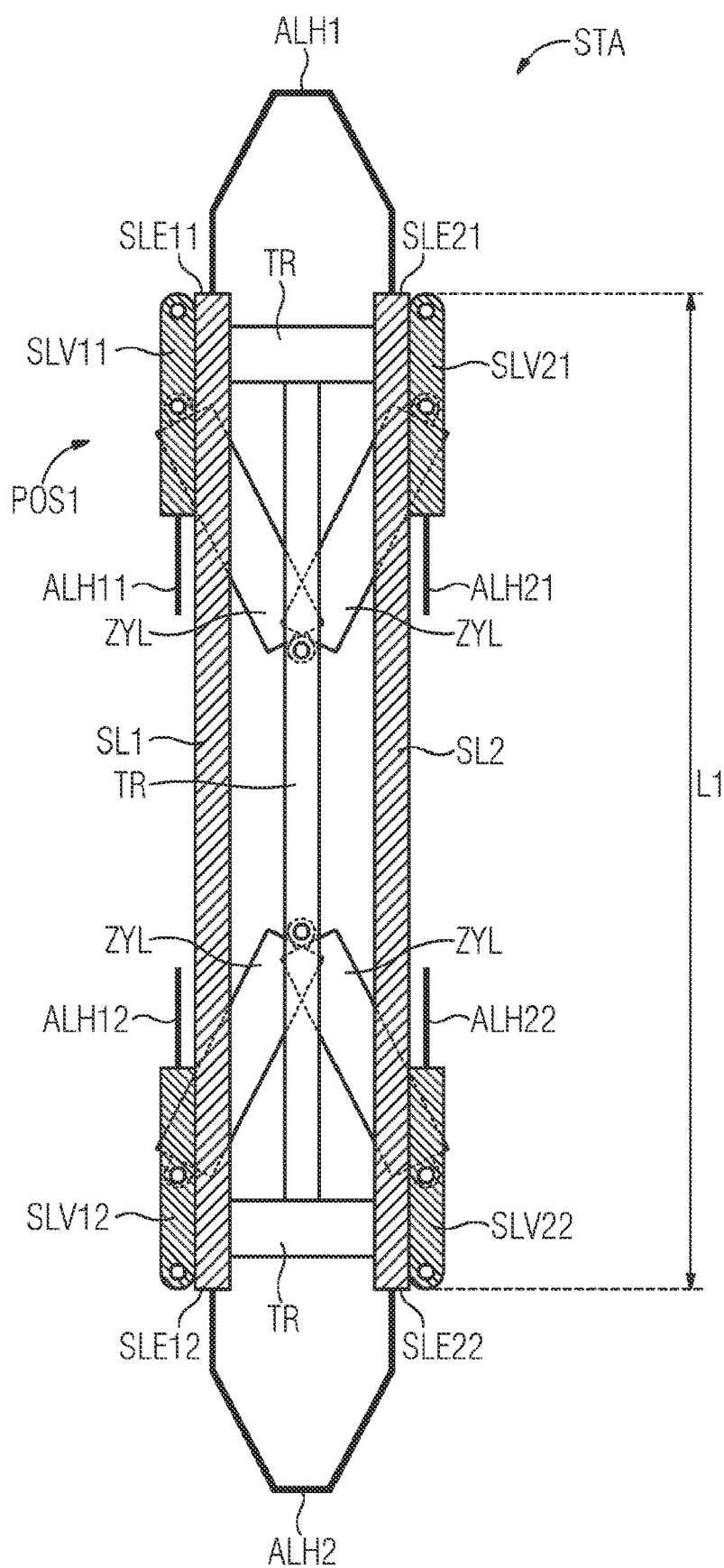
FIG. 1 shows a plan view of a first refinement of the current collector according to the invention in a folded-closed position.

FIG. 1 shows a plan view of a first refinement of the current collector according to the invention in a folded-closed position.

A support TR has two contact strips SL1, SL2. The two contact strips SL1, SL2 have a first length L1 and are at a predetermined distance from one another. The two contact strips SL1, SL2 are mounted on the support TR substantially parallel to one another.

The support TR is once again formed in such a way that, on the roof of the rail vehicle, it orients the two contact strips SL1, SL2 transversely with respect to the direction of travel of the rail vehicle and brings them into electrically conductive contact with a contact wire which is arranged along the direction of travel of the rail vehicle.

A first contact strip SL1 has a contact strip extension SLV11, SLV12 at each of its two ends SLE11, SLE12.

A second contact strip SL2 has a contact strip extension SLV21, SLV22 at each of its two ends SLE21, SLE22.

These contact strip extensions SLV11, SLV12, SLV21, SLV22 are connected to the respectively associated end SLE11, SLE12, SLE21, SLE22 of the contact strips SL1, SL2 in a rotatably mounted manner.

In the first position POS1 shown here, the contact strip extensions SLV11, SLV12, SLV21, SLV22 are arranged parallel with respect to the contact strips SL1, SL2 in such a way that a resulting total length of the contact strips SL1, SL2 with the associated contact strip extensions SLV11, SLV12, SLV21, SLV22 corresponds to the first length L1 of the contact strips SL1, SL2—that is to say, in the first position POS1, the contact strip extensions SLV11, SLV12, SLV21, SLV22 are folded closed here.

Each contact strip extension SLV11, SLV12, SLV21, SLV22 has a horn ALH11, ALH12, ALH21, ALH22 or a correspondingly configured residual contour at one end in each case.

In this example, the contact strip extensions SLV11, SLV12, SLV21, SLV22 are rotatably mounted on the outside of the two contact strips SL1, SL2 with respect to the current collector STA.

The position of the contact strip extensions SLV11, SLV12, SLV21, SLV22 is changed by rotation by means of four cylinders ZYL here.

For this purpose, each cylinder ZYL is connected to the support TR on a first side and to one of the associated contact strip extensions SLV11, SLV12, SLV21, SLV22 on a second side.

The contact strips SL1, SL2 and their contact strip extensions SLV11, SLV12, SLV21, SLV22 are preferably arranged in the first position POS1 and in the second position POS2 described below in such a way that the associated conductive layers or graphite layers (shown hatched here) are arranged in a common plane in order to ensure the power draw from the contact wire without problems.

In the example illustrated here, the two contact strips SL1, SL2 are connected to one another at their respective ends SLE11, SLE12, SLE21, SLE22, so that the connections implement the functionality of a horn ALH1, ALH2, which is to maintain consistent contact with overhead power lines.

The cylinders ZYL are shown in the retracted state here, wherein, for each contact strip extension SLV11, SLV12, SLV21, SLV22, one cylinder is provided for the rotation in each case.

Figure 2:
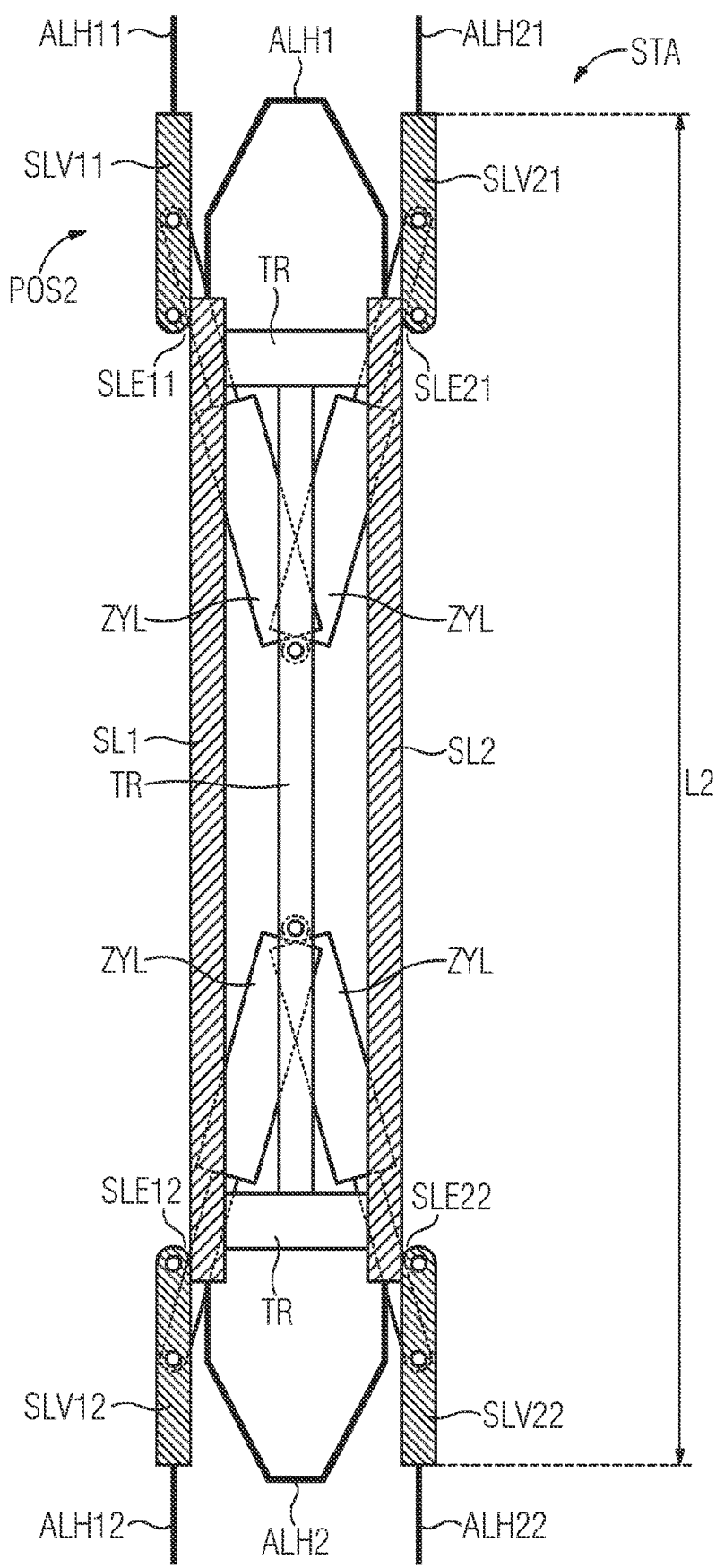
FIG. 2 shows, with reference to FIG. 1, the current collector according to the invention in a folded-open position.

FIG. 2 shows, with reference to FIG. 1, the current collector according to the invention in a folded-open position.

In the second position POS2 shown here, the contact strip extensions SLV11, SLV12, SLV21, SLV22 are arranged parallel with respect to the respective contact strips SL1, SL2 in such a way that the resulting total length of the contact strips SL1, SL2 with the associated contact strip extensions SLV11, SLV12, SLV21, SLV22 corresponds to a second length L2, which is greater than the first length L1.

In other words, the contact strip extensions SLV11, SLV12, SLV21, SLV22 are folded open here and accordingly extend the two contact strips SL1, SL2 from the first length L1 to the second (total) length L2.

Each contact strip extension SLV11, SLV12, SLV21, SLV22 has a horn ALH11, ALH12, ALH21, ALH22 or a correspondingly configured residual contour at one end, so that, in the second position POS2 of the contact strip extension SLV11, SLV12, SLV21, SLV22, the functionality of a horn is ensured for the extended contact strip.

The cylinders ZYL are shown in the extended state here.

Figure 3:
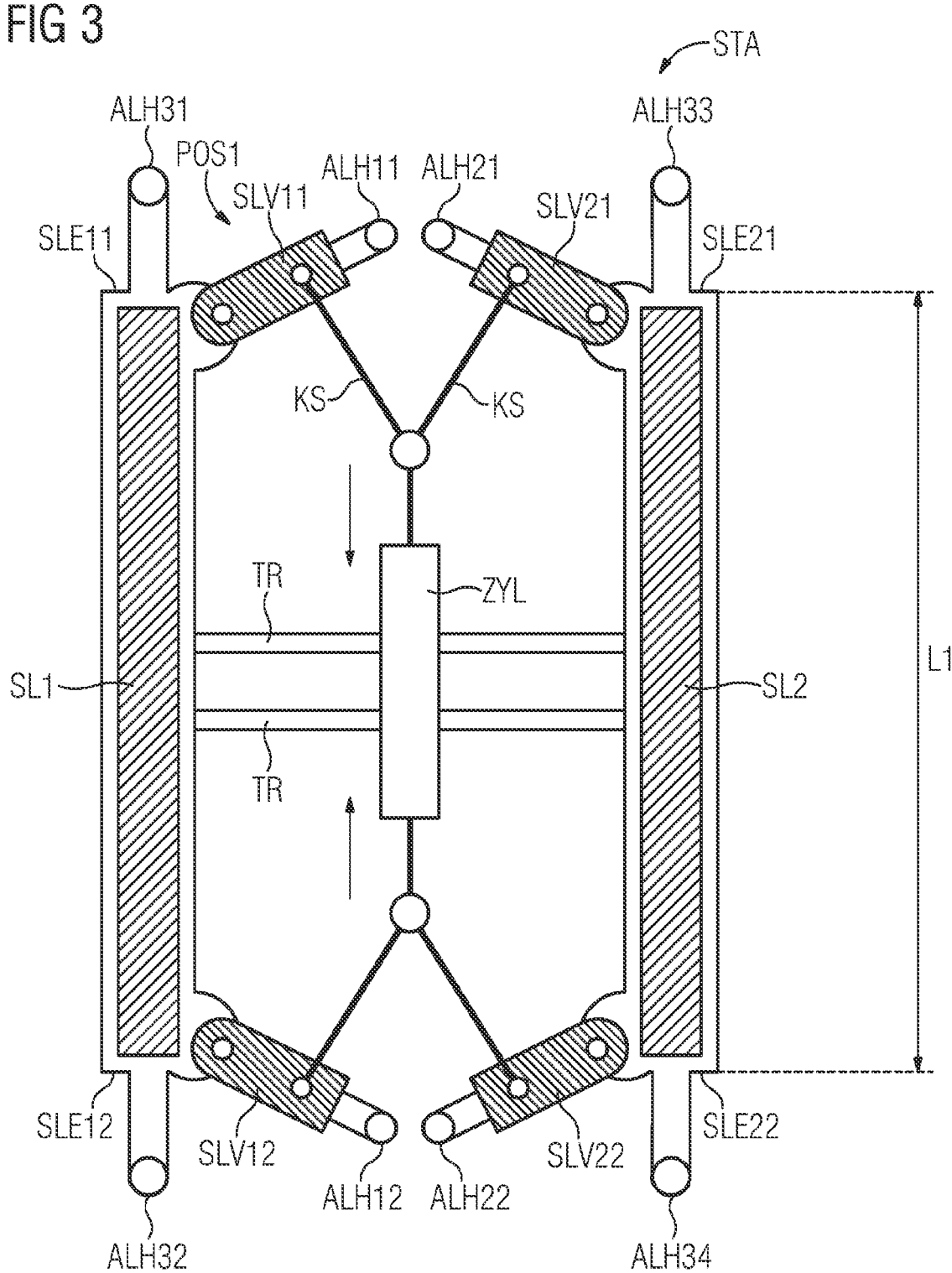
FIG. 3 shows a plan view of a second refinement of the current collector according to the invention in a virtually folded-closed position.

FIG. 3 shows a plan view of a second refinement of the current collector according to the invention in a virtually folded-closed position.

In this example, the contact strip extensions SLV11, SLV12, SLV21, SLV22 are rotatably mounted on the inside of the two contact strips SL1, SL2 with respect to the current collector STA.

A support TR has two contact strips SL1, SL2. The two contact strips SL1, SL2 have a first length L1 and are at a predetermined distance from one another. The two contact strips SL1, SL2 are mounted on the support TR substantially parallel to one another.

The support TR is once again formed in such a way that, on the roof of the rail vehicle, it orients the two contact strips SL1, SL2 transversely with respect to the direction of travel of the rail vehicle and brings them into electrically conductive contact with a contact wire. The contact wire is arranged along the direction of travel of the rail vehicle.

A first contact strip SL1 has a contact strip extension SLV11, SLV12 at each of its two ends SLE11, SLE12.

A second contact strip SL2 has a contact strip extension SLV21, SLV22 at each of its two ends SLE21, SLE22.

These contact strip extensions SLV11, SLV12, SLV21, SLV22 are connected to the respectively associated end SLE11, SLE12, SLE21, SLE22 of the contact strips SL1, SL2 in a rotatably mounted manner.

In the first position POS1 shown here, the contact strip extensions SLV11, SLV12, SLV21, SLV22 are arranged with respect to the contact strips SL1, SL2 in such a way that a resulting total length of the contact strips SL1, SL2 with the associated contact strip extensions SLV11, SLV12, SLV21, SLV22 corresponds to the first length L1 of the contact strips SL1, SL2.

Each contact strip extension SLV11, SLV12, SLV21, SLV22 has a horn ALH11, ALH12, ALH21, ALH22 or a correspondingly configured residual contour at one end in each case.

The position of the contact strip extensions SLV11, SLV12, SLV21, SLV22 is changed by rotation by means of just two cylinders ZYL here.

For this purpose, each cylinder ZYL is connected to the support TR on a first side and to the respectively associated contact strip extension SLV11, SLV12 and, respectively, SLV21, SLV22 on a second side via coupling rods KS.

The cylinders ZYL are shown in a virtually retracted state here.

The contact strips SL1, SL2 and their contact strip extensions SLV11, SLV12, SLV21, SLV22 are preferably arranged in the first position POS1 and in the second position POS2 described below in such a way that the associated conductive layers or graphite layers (shown hatched here) are arranged in a common plane in order to ensure the power draw from the contact wire without problems.

In the example illustrated here, the two contact strips SL1, SL2 are not connected to one another at their respective ends SLE11, SLE12, SLE21, SLE22, but rather have respective horns ALH31, ALH32, ALH33, ALH34 or a correspondingly configured residual contour.

Figure 4:
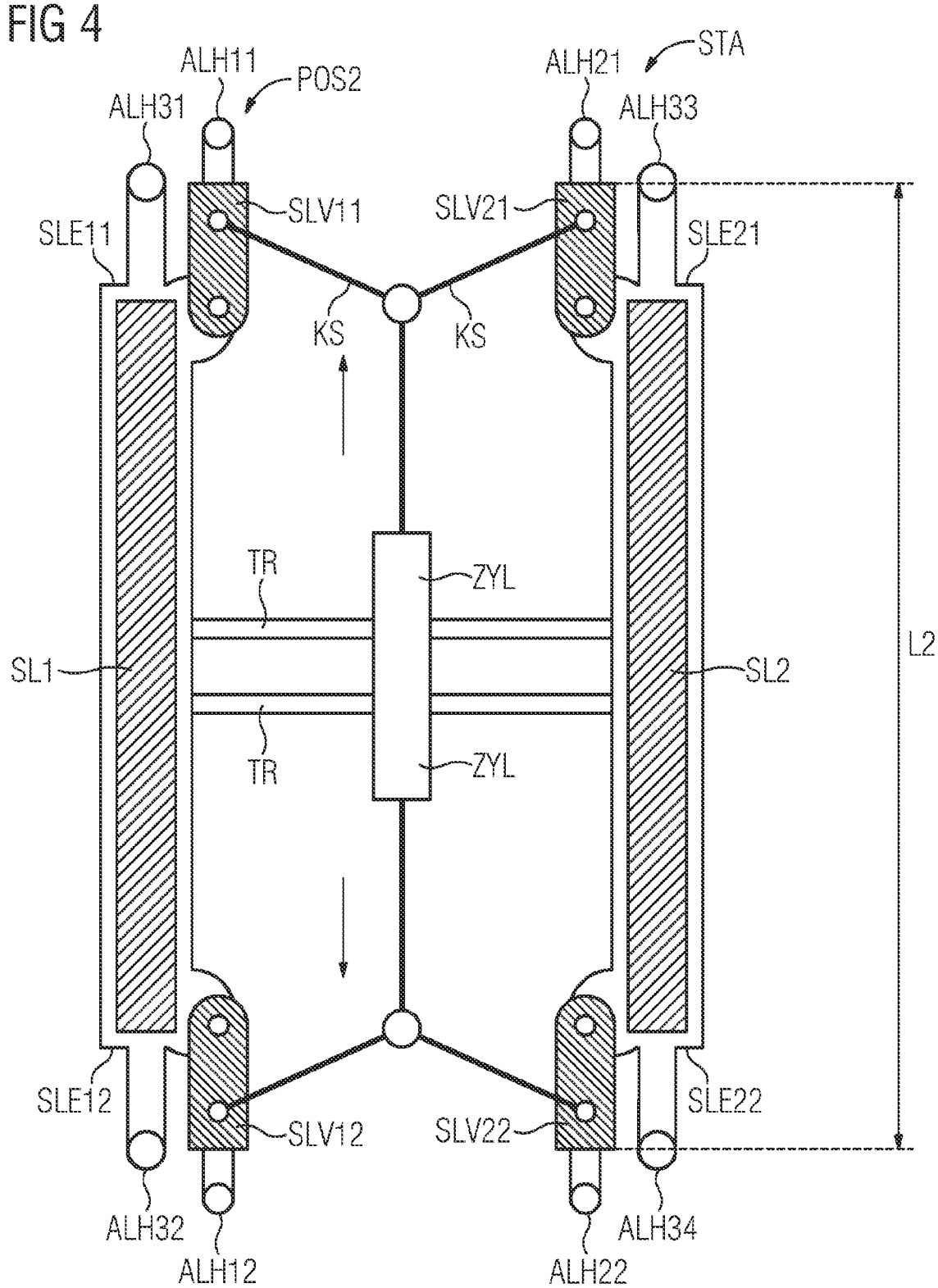
FIG. 4 shows, with reference to FIG. 3, the current collector according to the invention in a folded-open position.

FIG. 4 shows, with reference to FIG. 3, the current collector according to the invention in a folded-open position.

In the second position POS2 shown here, the contact strip extensions SLV11, SLV12, SLV21, SLV22 are arranged parallel with respect to the respective contact strips SL1, SL2 in such a way that the resulting total length of the contact strips SL1, SL2 with the associated contact strip extensions SLV11, SLV12, SLV21, SLV22 corresponds to a second length L2, which is greater than the first length L1.

In other words, the contact strip extensions SLV11, SLV12, SLV21, SLV22 are folded open here and accordingly extend the two contact strips SL1, SL2 from the first length L1 to the second (total) length L2.

Each contact strip extension SLV11, SLV12, SLV21, SLV22 has a horn ALH11, ALH12, ALH21, ALH22 or a correspondingly configured residual contour at one end, so that, in the second position POS2 of the contact strip extension SLV11, SLV12, SLV21, SLV22, the functionality of a horn is ensured for the extended contact strip.

The two cylinders ZYL are shown in the extended state here, wherein, for in each case two contact strip extensions SLV11, SLV12, SLV21, SLV22, one cylinder ZYL is provided for the rotation in each case.

The invention claimed is:
1. A current collector for a rail vehicle intended for cross-border transport, the current collector comprising:
two contact strips each having a first length, ends and contact strip extensions;

each of said contact strip extensions being connected to a respective one of said ends and being rotatably mounted about a vertical axis at said respective one of said ends;

a support configured to orient said two contact strips on a roof of the rail vehicle transversely relative to a direction of travel of the rail vehicle and said support configured to bring said two contact strips into electrically conductive contact with a contact wire;

in a first position, said contact strip extensions each being rotated about a respective vertical axis relative to a respective contact strip resulting in a total length of said contact strip with said respective contact strip extensions corresponding to said first length of said contact strip; and in a second position, said contact strip extensions each being rotated about a respective vertical axis relative to a respective contact strip resulting in a total length of said contact strip with said respective contact strip extensions corresponding to a second length being greater than said first length.

2. The current collector according to claim 1, wherein each of said contact strip extensions has one end with a respective horn, said horns functioning to maintain consistent contact with overhead power lines when said contact strips are extended in said second position of said contact strip extensions.

3. The current collector according to claim 1, which further comprises cylinders each configured to rotate a respective one of said contact strip extensions, each of said cylinders having a first side connected to said support and a second side connected to a respective one of said contact strip extensions.

4. The current collector according to claim 3, wherein said cylinders are hydraulic cylinders or compressed-air cylinders.

5. The current collector according to claim 1, wherein said two contact strips are mounted parallel to one another and at a predetermined distance from one another on said support.

6. The current collector according to claim 1, wherein said support orients and brings said two contact strips into electrically conductive contact with the contact wire being disposed along the direction of travel of the rail vehicle to implement current draw from the contact wire to said contact strips.

7. The current collector according to claim 1, which further comprises conductive layers or graphite layers associated with said contact strips and said contact strip extensions, said conductive layers or graphite layers being disposed in a common plane to ensure a power draw from the contact wire without problems in said first position and in said second position.

8. The current collector according to claim 1, wherein each of said contact strip extensions has one end with a respective horn, and said two contact strips having said first length are connected to one another at said respective ends of said two contact strips by respective connections implementing functionality of said horns to maintain consistent contact with overhead power lines.

9. The current collector according to claim 1, wherein:

in said first position, said contact strip extensions are disposed parallel to said respective contact strips resulting in said total length of said contact strip with said respective contact strip extensions corresponding to said first length of said contact strip; and in said second position, said contact strip extensions are disposed parallel to said respective contact strips resulting in said total length of said contact strip with said respective contact strip extensions corresponding to said second length being greater than said first length.

* * * * *